United States Patent
Malmuth et al.

(10) Patent No.: US 6,796,532 B2
(45) Date of Patent: Sep. 28, 2004

(54) SURFACE PLASMA DISCHARGE FOR CONTROLLING FOREBODY VORTEX ASYMMETRY

(76) Inventors: Norman D. Malmuth, 182 Maple Rd., Newbury Park, CA (US) 91320; Alexander Fedorov, 16 Gagarin Street, Zhukovsky Moscow Region 140180 (RU); Vladimir Shalaev, 16 Gagarin Street, Zhukovsky Moscow Region 140180 (RU); Vladimir Zharov, 16 Gagarin Street, Zhukovsky Moscow Region 140180 (RU); Ivan Shalaev, 16 Gagarin Street, Zhukovsky Moscow Region 140180 (RU); Anatoly Maslov, 4/1 Institutskaya, 630090 Novosibirsk (RU); Victor Soloviev, 9, Institutsky Per., Dolgoprudny Moscow Region 140700 (RU)

( * ) Notice: Subject to any disclaimer, the term of this patent is extended or adjusted under 35 U.S.C. 154(b) by 229 days.

(21) Appl. No.: 10/326,751

(22) Filed: Dec. 20, 2002

(65) Prior Publication Data

US 2004/0118973 A1 Jun. 24, 2004

(51) Int. Cl.$^7$ .............................................. B64C 21/00
(52) U.S. Cl. ..................................................... 244/204
(58) Field of Search ................................ 244/204, 205, 244/75 R, 78, 76 B

(56) References Cited

U.S. PATENT DOCUMENTS

| | | | | |
|---|---|---|---|---|
| 4,015,800 A | * | 4/1977 | Bihrle, Jr. ................... | 244/76 R |
| 4,176,813 A | * | 12/1979 | Headley et al. .............. | 244/130 |
| 4,225,102 A | * | 9/1980 | Frosch et al. ................ | 244/130 |
| 4,399,962 A | * | 8/1983 | Wedertz et al. ............. | 244/3.23 |
| 4,579,298 A | * | 4/1986 | Thomson .................... | 244/3.21 |
| 4,756,492 A | * | 7/1988 | Kranz ......................... | 244/3.1 |
| 4,786,009 A | * | 11/1988 | Rao et al. ................... | 244/75 R |
| 4,793,571 A | * | 12/1988 | Kranz ......................... | 244/3.1 |
| 4,802,642 A | * | 2/1989 | Mangiarotty ................ | 244/200 |
| 4,917,333 A | * | 4/1990 | Murri ......................... | 244/75 R |
| 4,925,139 A | * | 5/1990 | McCord .................... | 248/176.3 |
| 5,050,819 A | * | 9/1991 | Moskovitz ................. | 244/75 R |
| 5,139,215 A | * | 8/1992 | Peckham .................... | 244/3.21 |
| 5,139,216 A | * | 8/1992 | Larkin ........................ | 244/3.21 |
| 5,201,829 A | * | 4/1993 | Peters, Jr. .................. | 244/75 R |
| 5,207,397 A | * | 5/1993 | Ng et al. .................... | 244/45 A |
| 5,273,237 A | * | 12/1993 | Guyton et al. ............... | 244/52 |
| 5,326,050 A | * | 7/1994 | Zell ........................... | 244/75 R |
| 5,449,131 A | * | 9/1995 | Kramer ...................... | 244/91 |
| 5,669,583 A | * | 9/1997 | Roth .......................... | 244/130 |
| 5,794,887 A | * | 8/1998 | Komerath et al. ......... | 244/75 R |
| 5,797,563 A | * | 8/1998 | Blackburn et al. .......... | 244/130 |
| 5,927,645 A | * | 7/1999 | Latz .......................... | 244/75 R |
| 6,247,671 B1 | * | 6/2001 | Saeks et al. ................ | 244/205 |

* cited by examiner

Primary Examiner—J. Woodrow Eldred

(57) ABSTRACT

The present invention provides a system and method for rapidly and precisely controlling vortex symmetry or asymmetry on aircraft forebodies to avoid yaw departure or provide supplemental lateral control beyond that available from the vertical tail surfaces with much less power, obtrusion, weight and mechanical complexity than current techniques. This is accomplished with a plasma discharge to manipulate the boundary layer and the angular locations of its separation points in cross flow planes to control the symmetry or asymmetry of the vortex pattern. Pressure data is fed to a PID controller to calculate and drive voltage inputs to the plasma discharge elements, which provide the volumetric heating of the boundary layer on a time scale necessary to adapt to changing flight conditions and control the symmetry or asymmetry of the pressures and vortices. In the case of yaw departure avoidance, the PID controller controls the plasma to adjust the separation points to angular locations around the forebody that provide a robustly stable symmetric vortex pattern on a time scale that the asymmetries develop. In the case of lateral control, the PID controller controls the plasma to adjust the separation points to angular locations around the forebody that provide an asymmetric vortex pattern that produces the desired supplementary lateral force and rolling moment.

33 Claims, 13 Drawing Sheets

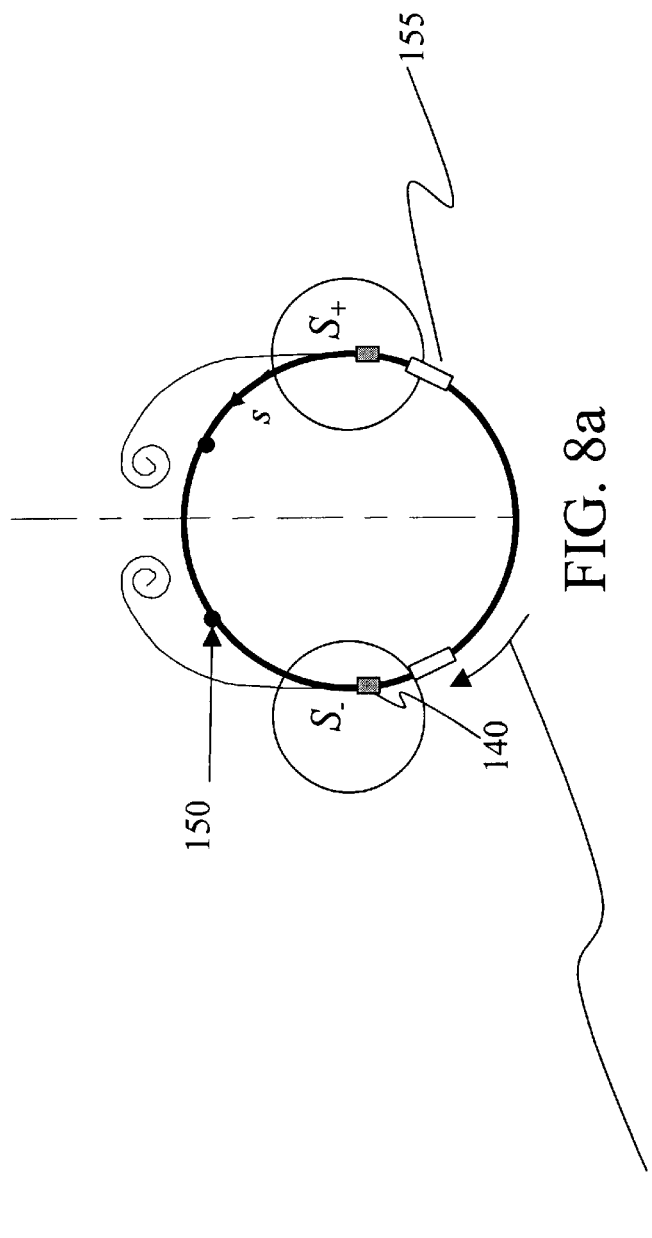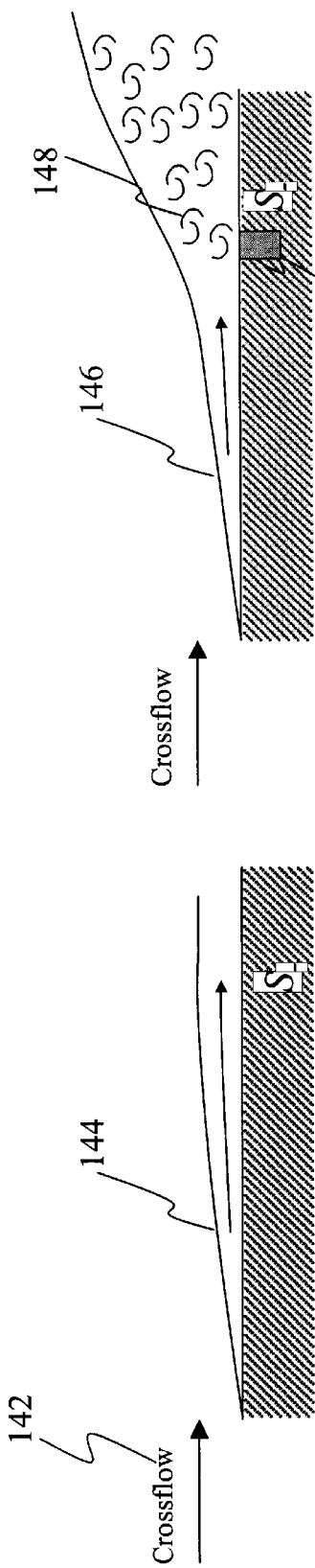
FIG. 8a
FIG. 8b
FIG. 8c

SURFACE PLASMA DISCHARGE FOR CONTROLLING FOREBODY VORTEX ASYMMETRY

BACKGROUND OF THE INVENTION

1. Field of the Invention

This invention relates to controlling forebody vortex asymmetry in high performance aircraft and other flight vehicles and more specifically to controlling such asymmetry through the introduction of plasma discharges on the aircraft forebody.

2. Description of the Related Art

Aircraft designed for high-speed flight and combat generally have pointed forebodies and swept wings. During maneuvers at subsonic speeds, examples of which include the landing approach and combat, such aircraft fly at high angles of attack with respect to the flight path. When a pointed forebody is placed at an angle of attack generally exceeding 10 degrees in a fluid flow, a pair of vortices forms on its leeside. Each vortex induces a region of low pressure on the adjacent surface, the pressure coefficient being related to the strength of the vortex and its proximity to the surface. At high angles of attack, these vortices develop in an asymmetric manner, so that a net side force is induced on the forebody. The product of this side force and the distance to the center of gravity of the aircraft is a yawing moment. An additional and separate effect is the interaction of the asymmetric vortices with the flow over the wings of the aircraft that causes asymmetry in the lift between the wings of the aircraft. This asymmetry in lift produces a rolling moment on the aircraft. A third effect, related to the first, occurs when the aircraft nose is yawed at high angle of attack with respect to the flight direction, the side force on the nose also produces a rolling moment.

As shown in FIG. 1, if an aircraft 10 is in level flight, the angle that a flow vector 12 (oncoming flow of air) makes with the aircraft's reference line 14 (the longitudinal axis between its nose and tail) is nearly zero. If the pilot pulls the stick back, the aircraft will pitch up and will reach an angle of attack α (the angle between the reference line 14 and the incoming flow vector 12) as shown in FIG. 2. If the aircraft 10 is maneuvering at a small angle of attack, the flow 16 around the aircraft is such that the boundary layer does not separate and therefore no vortices form as shown in FIG. 3. When the aircraft 10 maneuvers at a large angle of attack such as during a dogfight or when landing, the boundary layer 18 (a thin layer in which the viscosity of the air retards the airflow near the airplane surface) of flow 16 grows as the flow moves downstream and eventually breaks away or "separates" at separation points 20, forming eddies and vortices 22 in the flow that spin around themselves like miniature tornadoes as shown in FIG. 4. Separation and thus the formation of vortices occurs when the angle of attack exceeds the forebody half angle δ in FIG. 2. Generally, when the angle of attack exceeds twice the half-angle, the vortices are asymmetric in both position and strength. These vortices not only extract energy from the flow and produce wind resistance termed "drag" but they vibrate the aircraft in a way that can weaken it and make it hard to control. Separation can be particularly acute near the nose or "forebody" of the aircraft.

Most fighters have sharp slender noses to reduce drag. However, this makes the separation occur more readily. The biggest problem is that even if the aircraft 10 is symmetrically aligned to the relative wind on the pilot's left and right side (port and starboard) termed, zero yaw, the flow 16 and vortices 22 can separate asymmetrically as shown in FIG. 5. Asymmetric vortex configurations can yaw the aircraft so much that its tail will face the flow rather than its nose. This condition is termed "adverse yaw" or "yaw departure". It may cause the aircraft to go into an uncontrollable spin in an upside down or "inverted" position. In turn, this can cause the engines to stop ("stall"), leading to a crash. Generally this occurs so rapidly and with such force the pilot will not have enough control force or "authority" to quickly restore the aircraft to its equilibrium flight state.

A number of different techniques have been developed for controlling and reducing vortex asymmetry. These include passive strakes (see U.S. Pat. No. 4,225,102), deployable strakes (see U.S. Pat. Nos. 4,015,800; 4,786,009; 4,917,333; 5,207,397; 5,449,131), non-circular nose cross-sections (see U.S. Pat. No. 4,176,813), tiltable/rotatable noses (see U.S. Pat. Nos. 4,399,962; 4,579,298; 4,756,492; 4,793,571; 4,925,139; 5,050,819; 5,139,215; 5,139,216; 5,794,887) thruster jets (see U.S. Pat. No. 5,273,237) and other techniques (U.S. Pat. Nos. 5,201,829; 5,326,050). These patented techniques are effective to correct and reduce vortex asymmetry with varying degrees of success. However, even the best systems can occupy considerable space in the forebody of the flight vehicle, add considerable weight to the vehicle, consume large amounts of power, and have reliability issues associated with their mechanical complexity and compromise mission performance as well as other stability and control characteristics. High-performance fighters requiring high agility and other flight vehicles urgently need control systems that enable rapid and precise control to manage and overcome vortex asymmetry, with much less power, obtrusion, weight, performance degradation and mechanical complexity than current techniques. If these techniques can be developed, military vehicles can develop incredible agility and mission survivability. Commercial and general aviation vehicles also can be safer with these techniques since they frequently encounter high angle of attack environments where stallspin and yaw departure have caused frightening accidents.

Most aircraft have a vertical tail and controllable rudder. The tail itself provides a stabilizing influence to offset the vortex asymmetries. The rudder is used to coordinate turns as well as create lateral forces and rolling moments to control the yaw and roll of the aircraft. Under certain maneuvering conditions, even full deflection of the rudder will not provide adequate lateral control. Some aircraft use vectored thrust to supplement the rudder under these conditions. This sacrifices speed, energy and requires additional structure to withstand heat loads and high temperatures associated with the vectored thrust.

SUMMARY OF THE INVENTION

The present invention provides a system and method for rapidly and precisely controlling vortex symmetry or asymmery on aircraft forebodies to avoid yaw departure or provide supplemental lateral control beyond that available from the vertical tail surfaces with much less power, obtrusion, weight and mechanical complexity than current techniques.

This is accomplished with a plasma discharge to manipulate the boundary layer and the angular locations of its separation points in cross flow planes to control the symmetry or asymmetry of the vortex pattern. A closed-loop feedback control system that incorporates these principles includes three primary components; pressure sensors, a PID controller, and plasma discharge elements. Pressure sensors distributed around the forebody that include port and starboard locations provide information about the lateral symmetry of the pressures and vortices. The pressure data is fed to the PID controller to calculate and drive voltage inputs to the plasma discharge elements, which provide the volumetric heating of the boundary layer on a time scale necessary to adapt to changing flight conditions and control the symmetry or asymmetry of the pressures and vortices. In the case of yaw departure avoidance, the PID controller controls the plasma to adjust the separation points to angular locations around the forebody that provide a robustly stable symmetric vortex pattern on a time scale that the asymmetries develop. Stability may be further enhanced by using a boundary layer tripping plasma spark discharge that insures that both port and starboard sides are turbulent. In the case of lateral control, the PID controller controls the plasma to adjust the separation points to angular locations around the forebody that provide an asymmetric vortex pattern that produces the desired supplementary lateral force and rolling moment.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2, as described above, is a side elevation of a winged aircraft maneuvering with an angle of attack a;

FIGS. 8a–8c are cross-sectional views of a forebody illustrating the use of plasma discharge to make the flow on port and starboard sides turbulent to avoid a mixed configuration of a laminar or transitional boundary layer on one side and turbulent on the other or other different combinations;

DETAILED DESCRIPTION OF THE INVENTION

The present invention provides a system and method for rapidly and precisely controlling vortex symmetry on aircraft forebodies to avoid yaw departure or provide supplement lateral control for by the tail rudder with much less power, obtrusion, weight performance degradation and mechanical complexity than current techniques. This is accomplished with plasma discharge to manipulate the boundary layer and the angular locations of its separation points to control the symmetry or asymmetry of the vortex pattern. The closed-loop control system includes three essential components; pressure sensors, a PID controller, and plasma discharge elements. Pressure sensors located at selected starboard and port locations on the forebody sense the distribution of air pressure on either side of the aircraft. The pressure data is fed to the PID controller to calculate and adjust the drive conditions for the plasma discharge elements, which provide the volumetric heating of the boundary layer on a time scale necessary to adapt to changing flight conditions.

Figure 1:
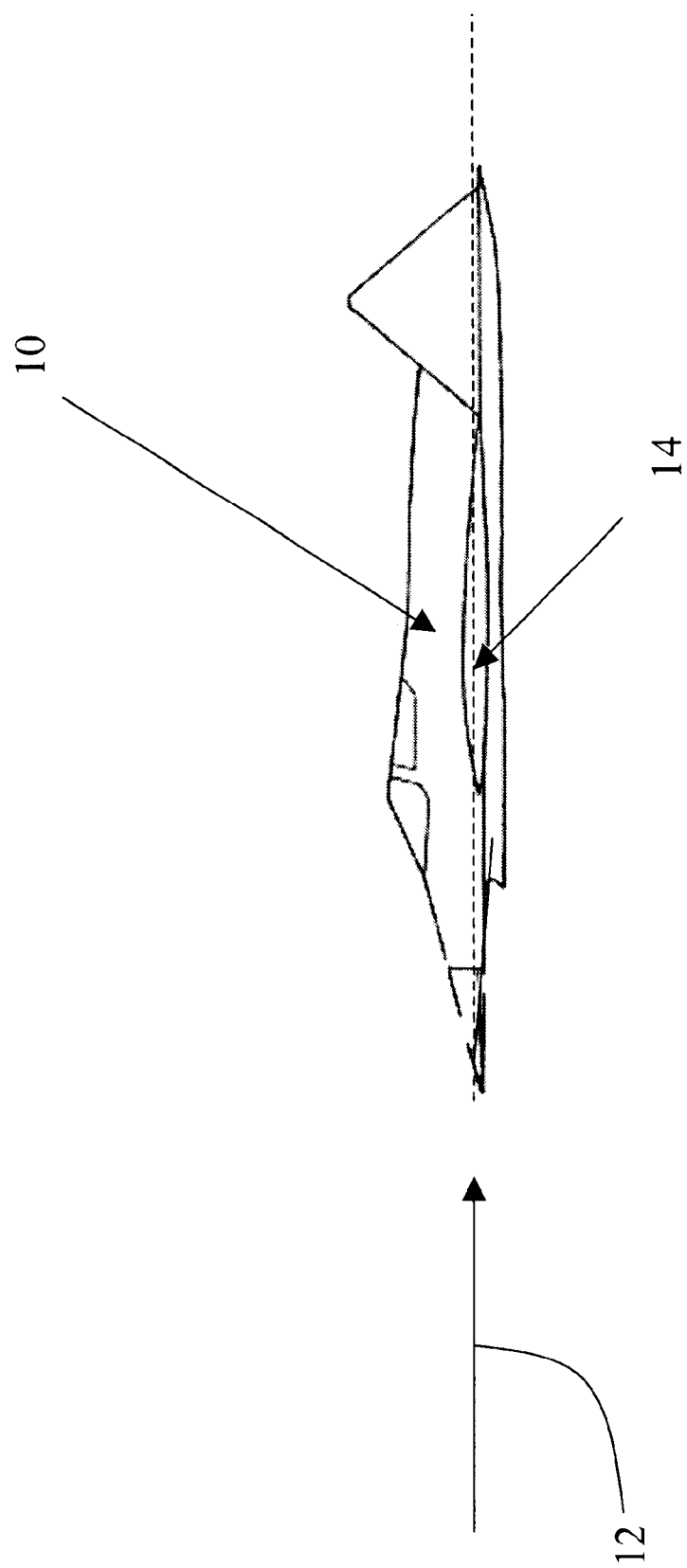
FIG. 1, as described above, is a side elevation of a winged aircraft in level flight.
Figure 2:
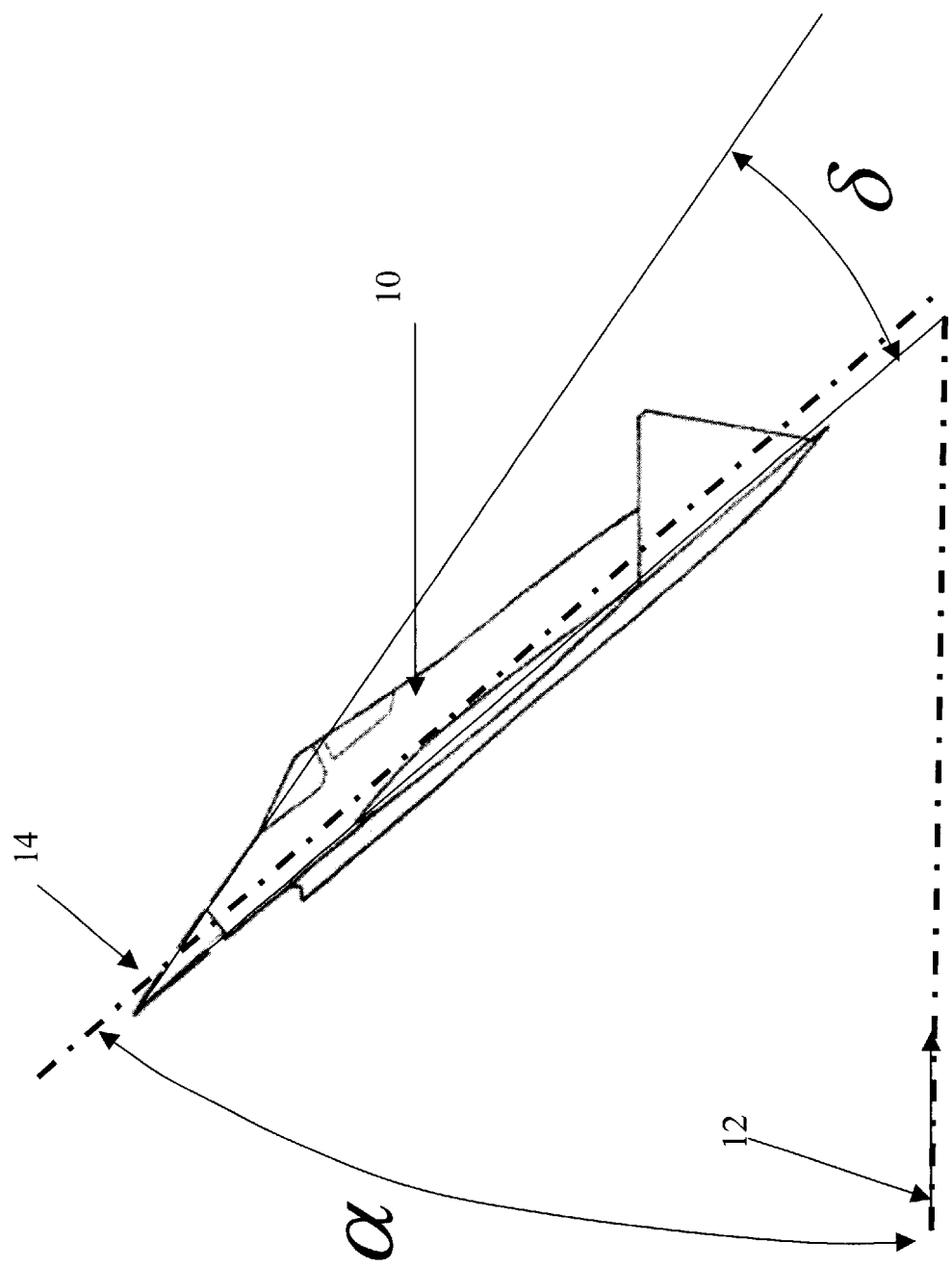
Figure 3:
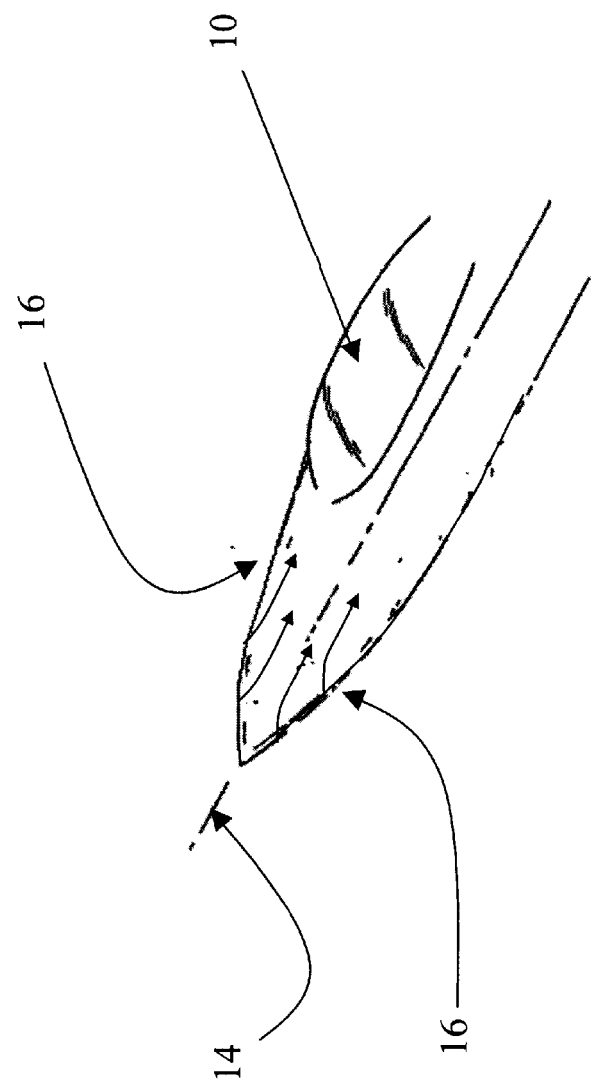
FIG. 3, as described above, is a side elevation of a winged aircraft illustrating smooth flow over the forebody.
Figure 4:
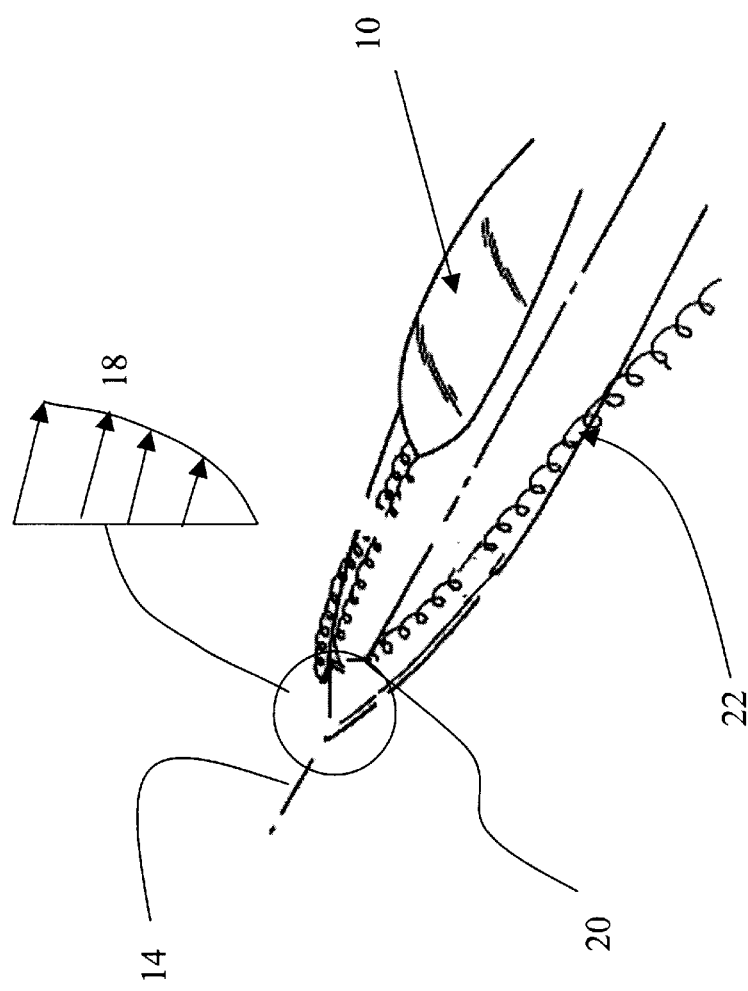
FIG. 4, as described above, is a side elevation of a winged aircraft illustrating flow separation and the creation of vortices.
Figure 5:
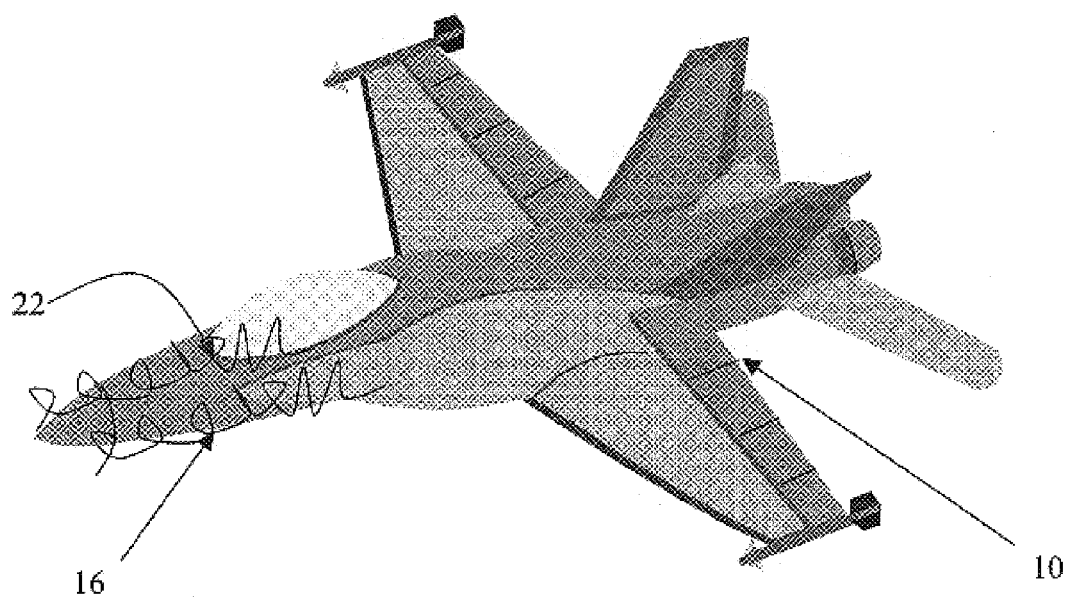
FIG. 5, as described above, is a side elevation of a winged aircraft illustrating asymmetric vortex separation.
Figure 6A:
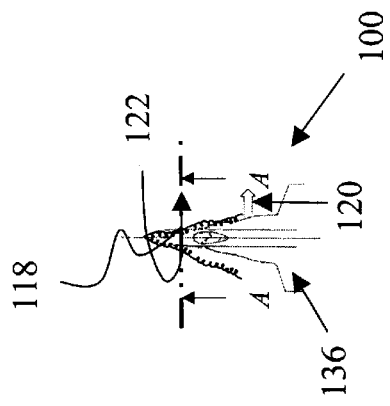
FIGS. 6a–6c are the forebody, a cross-sectional view of the forebody along section A—A, and a plot of the distribution of air pressure around the contour along the cross-section illustrating the boundary layer separation positions forming an asymmetric vortex pattern in accordance with the present invention.
Figure 6C:
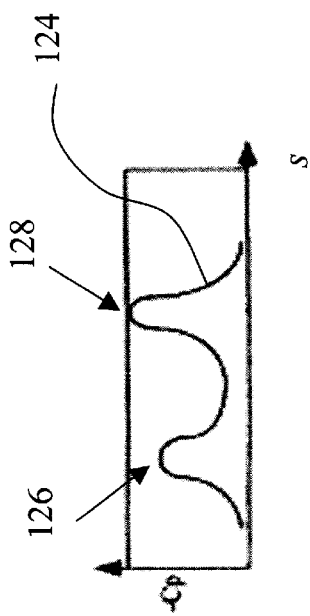
Figure 6B:
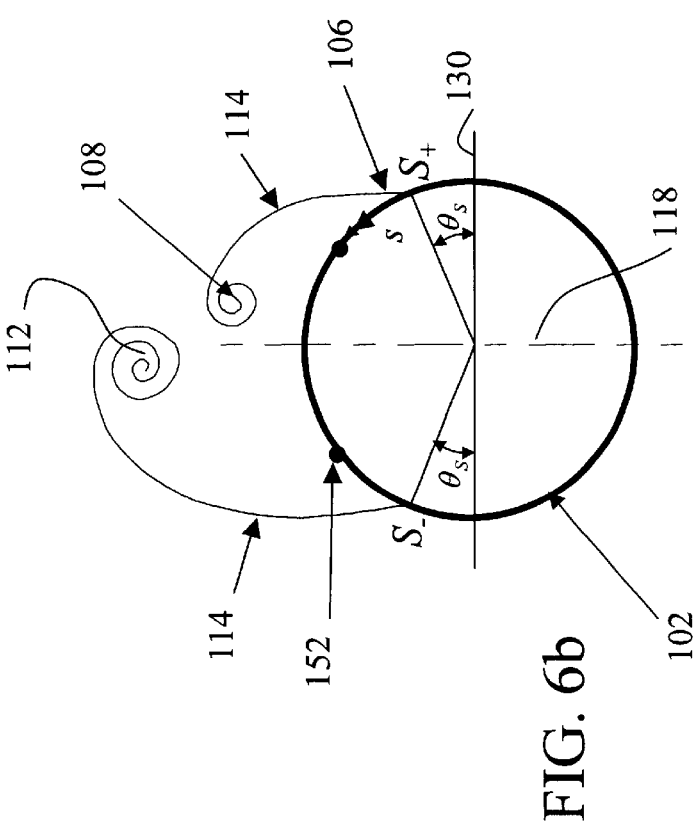
Figure 7A:
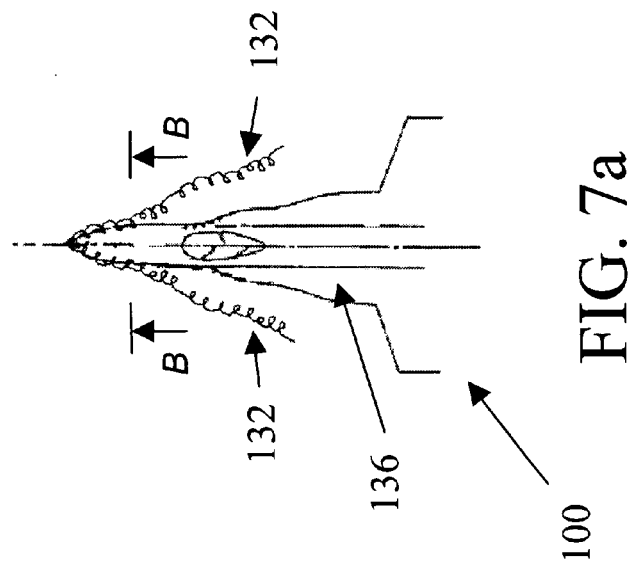
FIGS. 7a–7c are the forebody, a cross-sectional view of the forebody along section B—B, and a plot of the distribution of air pressure around the contour along the cross-section illustration the boundary layer separation positions forming a symmetric vortex pattern in accordance with the present invention.
Figure 7B:
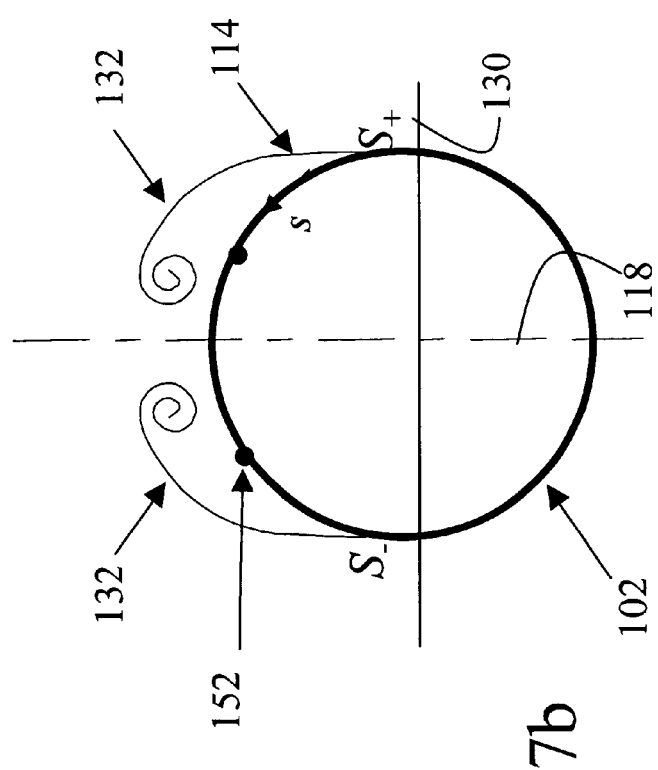
Figure 7C:
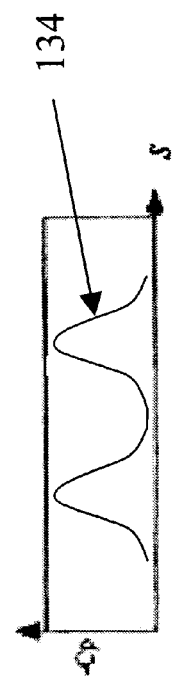

FIGS. 6 and 7 are used to illustrate the general principles of vortex symmetry control through plasma discharge and to illustrate the specific cases of using plasma discharge to produce a stable symmetric vortex pattern to avoid yaw departure and to produce an asymmetric vortex pattern to produce lateral forces to supplement the tail rudder. In the case of yaw departure avoidance, FIGS. 6a through 6c illustrate the problem of vortex asymmetry that may exist when the normalized angle of attack A, which is defined as the actual angle of attack $\alpha$ divided by the included nose angle $\delta$ both shown in FIG. 2, is sufficiently large to cause asymmetric vortex separation. FIGS. 7a through 7c illustrate the use of plasma discharge to adjust the separation points to angular locations closer to the equatorial line or windward side that provide a robustly stable symmetric vortex pattern. FIGS. 8a–8c illustrate the use of plasma discharge to create a turbulent flow that may further enhance the stability of the symmetric vortex pattern. In the case of supplemental lateral control, FIGS. 7a–7c illustrate vortex symmetry that exists when the aircraft is cruising and FIGS. 6a through 6c illustrate the use of plasma discharge to adjust the separation points to angular locations further away from the equatorial line to provide an asymmetric vortex pattern that creates the desired lateral forces.

Yaw Departure Avoidance

Plasma discharge is used to maintain a stable symmetric vortex pattern as the aircraft maneuvers to avoid yaw departures that could otherwise turn the airplane around with its tail rather than its nose facing the flow. Yaw departures can lead to a destructive flight interruption (crash).

As shown in FIGS. 6a through 6c, vortices 112, 108 develop along the flow as it moves past a forebody of aircraft 100. More specifically, the circumferential boundary layer 106 around the cross sectional contour of forebody 102 separates at two points $S_+$ and $S_-$ if A is sufficiently large. The angular location $\theta_S$ of the separation points $S_+$ and $S_-$, which is a function of normalized angle of attack A, controls the likelihood of symmetry and asymmetry of the vortex pair. The feeding sheets 114 of airflow break away above contour 102 from the separation points and feed themselves into the pair of asymmetric vortices 108, 112 as shown in FIG. 6b. Since the cores of vortices 108, 112 are asymmetrically located about a line of symmetry 118 and the rate of rotation of the flow around the core or vortex strength is unequal on both sides of line 118, a side force 120 and rolling moment 122 develop as shown in FIG. 6a, which can cause a yaw departure. These forces are reflected in the distribution of air pressure 124 provided by pressure sensors 150 around the contour 102, which forms two asymmetrically peaked lobes 126 and 128 as shown in FIG. 6c.

As shown in FIGS. 7a–7c, to avoid yaw departure, the present invention senses the asymmetry in the pressure distribution shown in FIG. 6c and generates a plasma discharge on the forebody to adjust the boundary layer separation points $S_+$ and $S_-$ to angular locations $\theta_S$ towards the equatorial line 130 that provide robustly stable symmetric vortices 132 (FIGS. 7a and 7b) and pressure distribution 134 (FIG. 7c). Plasma surface discharges supply the volumetric heating on and above the surface of the forebody on a time scale needed to respond to and compensate for changes in the pressure distribution. Accordingly, no yaw side forces are exerted on the aircraft forebody 136 as shown in FIG. 7c.

Since the flows on the port and starboard side may be different combinations of laminar, turbulent and transitional flows. One embodiment of the present invention would trip both port and starboard sides to turbulent flow to simplify a subsequent step in controlling the asymmetry. This arrangement could be a hybrid configuration consisting of spark discharges to create the turbulent flow upstream of the separation points and another type of discharge to move them to a stable position.

FIGS. 8a–8c illustrate the use-of spark discharges 140 to trip the flow from laminar to turbulent flow. A close-up of the circumferential cross flow 142 over the surface in the vicinity of the discharge locations bounded by the circles in FIG. 8a is shown for the case of the discharge power off in FIG. 8b and on in 8c. Heat transfer gauges 155 sense an asymmetry in the boundary layer state. For example, a turbulent boundary layer will be recorded as higher heat transfer rate than a laminar one. If the condition of the boundary layers upstream of the corrective discharge units are the same, symmetrical heat flux readings will occur. As an example, without the discharge, the laminar boundary layer's edge 144 follows a laminar growth in the direction of the flow as shown in FIG. 8b. When the spark discharge is ignited it acts like a roughness element which induces a "bypass" transition process that circumvents a more gradual one involving amplification of instability waves and abruptly "trips" the boundary layer from it laminar state 146 to a turbulent one 148. The turbulent one grows at a more rapid rate and contains a random set of disorderly eddy motions as indicated in FIG. 8c.

The use of a surface plasma discharge to control $\theta_S$ and avoid yaw departure does not require moving parts or engine bleed air, does not create significant additional external drag and is extremely lightweight and low power.

Supplemental Lateral Control

Plasma discharge is used to provide supplemental lateral forces to control the yaw/direction and roll of the aircraft. Under certain maneuvering conditions, even fill deflection of the rudder will not provide adequate lateral control. Without additional controls the aircraft could lose control and crash or be limited in its maneuvering capability.

As shown in FIGS. 7a through 7c, vortices 132 develop along the flow as it moves past a forebody 136 of aircraft 100. More specifically, the boundary layer 106 around the cross sectional contour 102 of forebody separates at two points $S_+$ and $S_-$ as shown in FIG. 7b. The angular location $\theta_S$ of the separation points $S_+$ and $S_-$, which is a function of normalized angle of attack A, controls the likelihood of symmetry and asymmetry of the vortex pair. For purposes of this example, we assume that the aircraft is cruising so A is sufficiently small, hence the angular location $\theta_S$ is sufficiently small so that when the feeding sheets 114 of airflow break away above contour 102 from the separation points they feed themselves into the pair of symmetric vortices 132 as shown in FIG. 7b. Since the cores of vortices 132 are symmetrically located about a line of symmetry 118, no lateral forces or rolling moments develop as reflected in the symmetric distribution of air pressure 134 around the contour 102 as shown in FIG. 7c.

As shown in FIGS. 6a–6c, to provide supplemental lateral control the present invention senses the pressure distribution shown in FIG. 7c and generates a plasma discharge on the forebody to adjust the boundary layer separation points $S_+$ and $S_-$ to angular locations $\theta_S$ sufficiently far away from the equatorial line 130 that provide asymmetric vortices 108, 112 (FIG. 6b) and asymmetric pressure distribution 124 (FIG. 6c). Plasma surface discharges supply the volumetric heating on and above the surface of the forebody on a time scale needed to respond to and compensate for changes in the pressure distribution caused by changing flight conditions and maneuvering of the aircraft. As a result, lateral forces are exerted on the aircraft forebody 136 as shown in FIG. 6a. Note, this type of supplemental lateral control is most likely to be employed when the vertical tail or rudder is insufficient to provide sufficient control authority. Under these conditions, the vortex pattern may well be asymmetric. In either case, plasma discharge is used to adjust the vortex pattern to the asymmetric configuration that best supplements the vertical tail or rudder.

The use of a surface plasma discharge to control $\theta_S$ to supplement the tail rudder does not require vectored thrust from the engines, is extremely lightweight and low power. It could substantially enhance mission survivability and safety.

Plasma Discharge Control System

Figure 9:
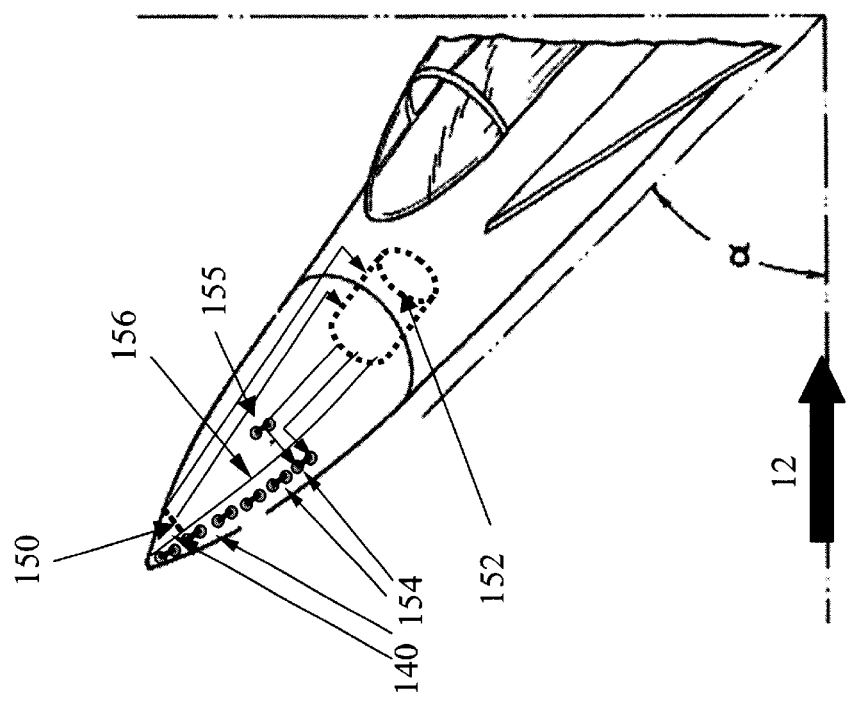
FIG. 9 is a perspective close-up view of the nose region of typical current inventory fighter aircraft showing the key components of the present invention including the electrodes, voltage generator, PID controller and sensors.

As shown in FIG. 9, the closed-loop control system includes three primary components; pressure sensors 150, a PID controller 152, and plasma discharge elements 154 that are installed in the aircraft's forebody 136. Pressure sensors 150 located at selected starboard and port locations on the forebody provide a distribution of air pressure 124, 134 of the type shown in FIGS. 6c and 7c. The pressure data is fed to a PID controller 152 to calculate and adjust the voltage required for the plasma discharge elements 154 that provide the volumetric heating of the boundary layer on and above the surface of the forebody on a time scale necessary to adapt to changing flight conditions. The electrodes are suitably located near the locus of anticipated separation lines 156 at typical high angle attack conditions. For yaw departure avoidance, the PID controller controls the plasma to adjust the separation points to angular locations that provide a robustly stable symmetric vortex pattern on a time scale that the asymmetries develop. Stability may be further enhanced by using a hybrid arrangement of discharge elements 154 that are used to control the angular locations of the separation points and plasma discharge elements 140 that create turbulent boundary layers on port and starboard sides of the vehicle if one side is laminar and the other is turbulent. As mentioned previously, another possibility is that one side is transitional and the other is laminar or turbulent. Heat transfer gauges 155 can be installed on port and starboard sides to sense this bilateral asymmetry of the boundary layer state. A strong difference in heat transfer at mirror image points will reveal this condition. The aforementioned spark discharge method will assure both sides are turbulent prior to the $\theta_S$ adjustment by plasma heating. For lateral control, the PID controller controls the plasma to adjust the separation points to angular locations that provide an asymmetric vortex configuration that produces the desired lateral force and moment.

The plasma discharge moves the angular location of the separation points by heating the boundary layer. Simplifying the problem greatly, the friction of the circumferential airflow over the forebody tends to keep the boundary layer attached to the surface. As the angle of attack increases, the boundary layer breaks free (separates) and may generate asymmetric vortices. At the cross flow separation points, the frictional force between the boundary layer and the surface is zero. This (skin) friction is the product of the viscosity and velocity gradient of the flow perpendicular to the aircraft surface. For turbulent boundary layers the effective viscosity is a weak function of temperature. On the other hand, heating the boundary layer makes it thicker, reducing the velocity gradient and therefore the skin friction. Accordingly, the skin friction is reduced and the boundary layer separates earlier. This moves the vortices to a more stable symmetric location. The most practical method to heat the boundary layer is by a plasma discharge since it provides time scale (on the order of a microsecond) necessary to rapidly respond to and compensate to changes in the vortex pattern. In contrast, conventional ohmic heating schemes that involve resistance-heated wires only provide surface heating with a time constant of about 0.1 second. The ohmic heating time is too long for adaptive control of vortex symmetries, which develop in a much shorter time. In addition, the temperature gradient associated with ohmic heating is much smaller.

Figure 10A:
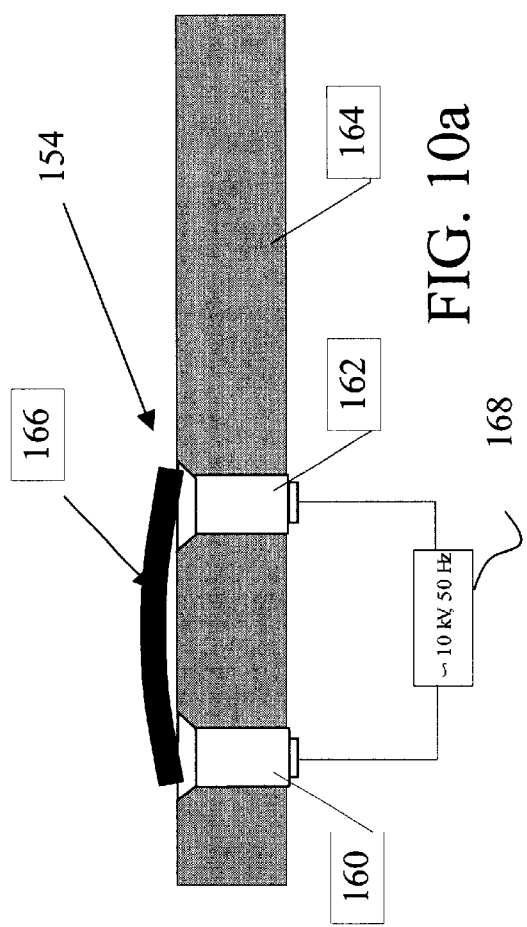
FIGS. 10a and 10b are side and top views of a plasma discharge circuit.
Figure 10B:
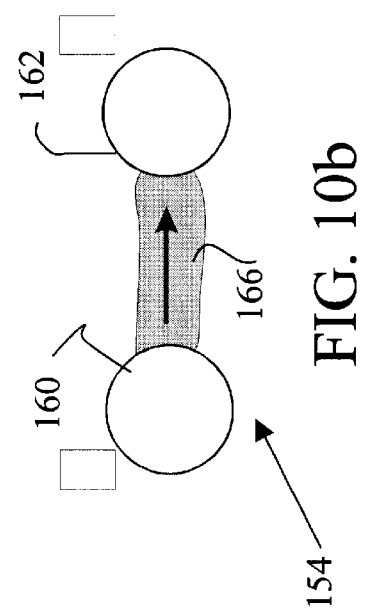

As shown in FIG. 10*a*, the plasma discharge elements 154 may be electrodes having an anode 160 and cathode 162 that are flush mounted in a dielectric substrate 164. As shown in FIG. 10*b*, the discharge 166 occurs across a gap between electrodes 160 and 162. In this arrangement, the electrodes are 8 mm in diameter with a 18 mm center-to-center spacing for an arc of 10 mm. The voltage generator 168 provides enough potential to break down the air gap. Typical component parameters are a 10 kV direct voltage supply with 50 Hz frequency connected to a 50–150 mA working current and 600–800 V discharge gap voltage with the arc supporting 40–100 W of electrical power. Above the breakdown potential, the PID controller controls the potential to adjust the amount and location of volumetric heating. Other embodiments may use corona, spark, slipping or sliding discharges. A unique feature of the invention is the location of the electrodes near the locus of anticipated separation lines 156 at typical high angle attack conditions as shown in FIG. 9. This will give maximum effectiveness of the Joule heating addition to move said separation lines and $\theta_S$ The spark discharge is particularly useful in the hybrid configuration since it trips both sides of the forebody boundary layer to a turbulent rather than a transitional or laminar state, which can be subsequently further adjusted to createa robustly stable symmetric vortex pair. This is accomplished by using a pressure wave initiated by the spark at the bottom of an open cavity below the forebody surface.

Figure 11A:
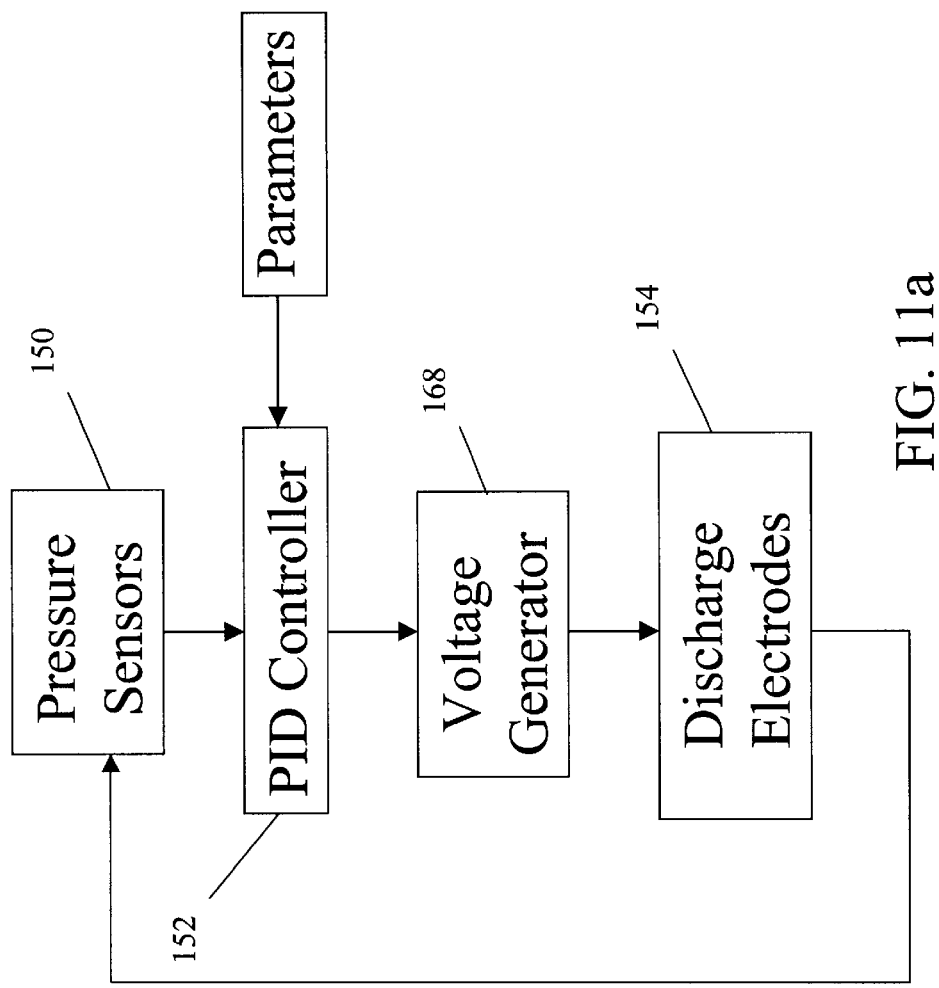
FIGS. 11a and 11b are a schematic block diagram of the control system and a flow chart illustrating the closed loop feedback control scheme.
Figure 11B:
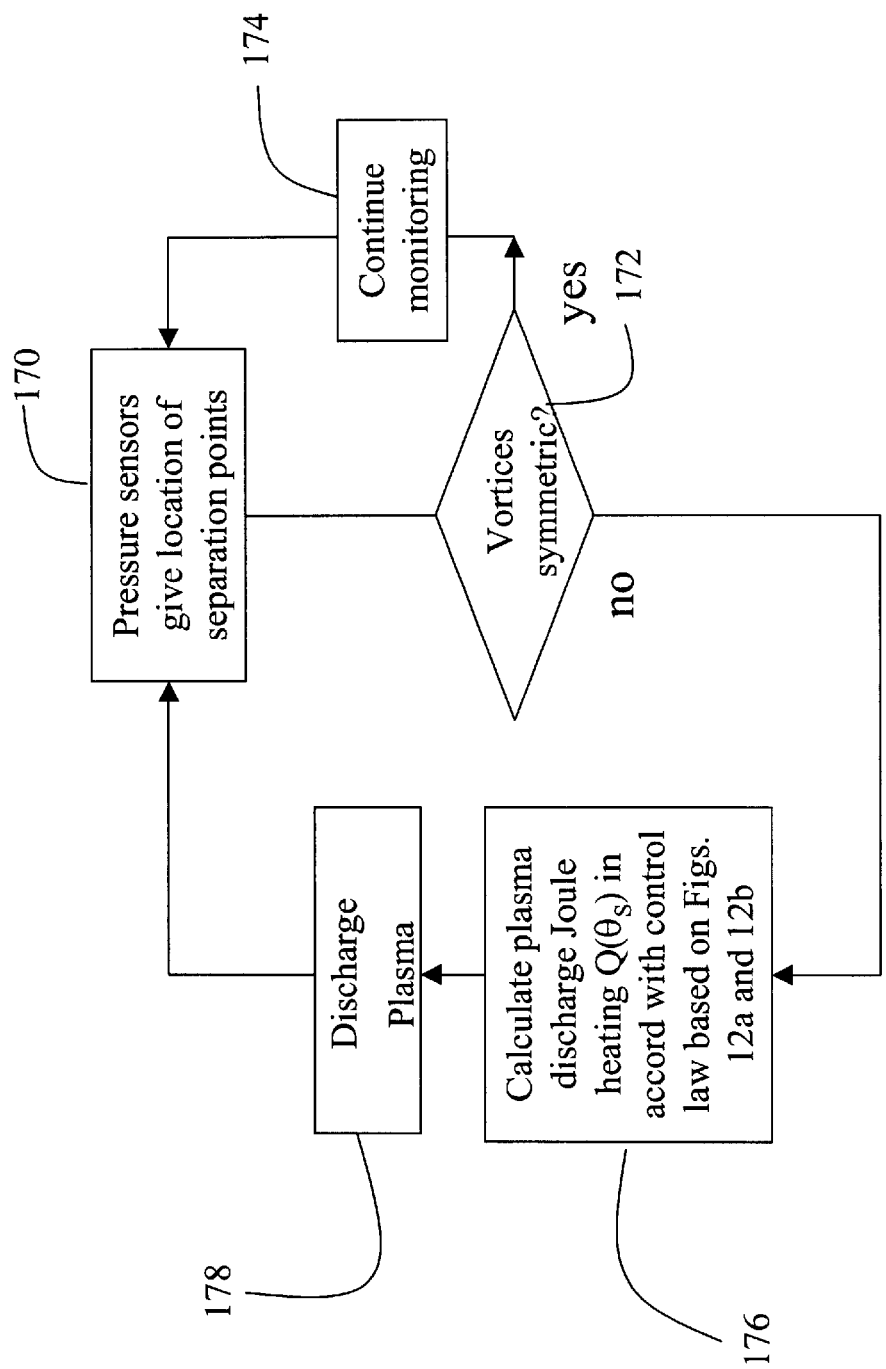

As shown in FIGS. 11*a* and 11*b*, the PID controller 152 receives the pressure sensor readings from pressure sensors 150 (step 170), which give the location of the separation points, and, based on those readings, compares the measured vortex pattern to the desired vortex pattern (step 172). If the patterns are sufficiently similar, the controller continues to monitor the pressure readings (step 174). If not, the PID controller calculates voltages for voltage generator 168 to drive the plasma discharge elements 154 to provide plasma discharge Joule heating $Q(\theta_S)$ to manipulate the separation points in accordance with the control law based on FIGS. 12*a* and 12*b* (step 176) and the discharge elements 154 discharge the plasma to starboard and port of the forebody (step 178). Steps 170, 172, 174, 176 and 180 are repeated to converge to the desired vortex pattern and continuously adapt to changing flight conditions.

The general calculations, calibration and empirical testing for characterizing vortex asymmetries are known in the art. The contribution of the present invention is to realize that plasma discharges can be used to provide volumetric heating on a short time scale to adjust the angular locations of the separation points to achieve a desired vortex pattern and to estimate the amount of Joule heating $Q(\theta_S)$, e.g. plasma discharge, required to achieve the goal. To provide the basis for the control law for the scheme in FIG. 12, particularly the step in 176, a first-cut theoretical model was developed for treatment of the stability and symmetry breaking of lee separation fed vortex structures over a sharp slender cone at incidence.

The appropriate value for $\theta_S$ for robustly stable vortex symmetry used slender-body asymptotic gasdynamics/aerodynamic theory with a unique treatment in cross flow planes such as A—A in FIG. 6*a* and B—B in FIG. 7*a* involving the stability of the cross flow saddle point, a location in the vicinity of which the cross flow streamlines appear as hyperbolae and at which the cross flow velocity components vanish. The overall problem is reduced to analysis of a cross flow consisting of two point vortices interacting with the vortex sheets fed from the separating cross flow boundary layer. Numerical solutions of the inviscid problem were obtained for normalized angles of attack A=1.5 to 10 and separation angles $\theta_S$=30–70°. These calculations facilitate identification of both symmetric and asymmetric solutions and establish their boundaries in the parameter space ($\theta_S$, $\alpha$). This data is vital to obtaining a $\theta_S$ target for the controller.

As part of the study of symmetric and asymmetrical vortex regimes, new approaches were developed to study linear and nonlinear stability of the vortex structure. The first approach is based on temporal and spatial stability analyses of flow near the saddle point formed between the point vortices. This leads to a stability problem governed by the Ginzburg-Landau equation. The solution of this problem shows that the flow near the saddle point is unstable and leads to nonlinear breakdown of the symmetric vortex structure downstream of an initial disturbance. The critical level of the perturbations and critical time or distance depends on the flow conditions. Transient disturbances lead to asymmetry if their lifetime is larger than the time of propagation to the critical point. The nonlinear breakdown mechanism associated with the saddle point instability is consistent with experimental observations. These show that the flow is extremely sensitive to small disturbances, such as nose vibration, roughness and surface distortions. This imposes severe restrictions on a close-loop feedback system of asymmetry control using blowing, MEMS, counterphasing concepts and other micro-adaptive flow control devices.

The second approach is to determine the response of the vortex system and feeding sheet cuts to symmetric or asymmetric infinitesimal displacements. This type of instability dominates at separation angles larger than 62° because of a strong interaction between closely spaced vortices. The instability predictions correlate well with the secondary and tertiary instabilities observed in experiments. The stability analyses of the vortex structure indicate that shifting the separation locus toward the windward side of the cone surface can effectively control forebody vortex symmetry breaking and resulting yaw departures. This can be achieved using plasma discharges. To assess feasibility of separation control with the help of surface discharges, the boundary layer past a volumetric heat source simulating a surface plasma discharge was calculated. The analysis solved the three-dimensional boundary layer equations with a compressibility correction and a source term modeling the Joule heating. The separation point was calculated to be the location where the shear stress vanished. This shear stress was calculated as the product of the eddy viscosity from the Cebeci-Smith turbulence model and the circumferential velocity gradient normal to the wall, at the wall. It was demonstrated that plasma heating led to stabilization of the symmetric flow mode. The estimates show that this method of asymmetry control requires a power supply only of the order of 200 W in conventional wind-tunnel flow conditions.

This analysis provides a control law that makes the rapidly convergent control of the cross flow separation point $\theta_S$ possible with heating from a plasma discharge. We denote hereinafter Q as the plasma volumetric Joule heat flux supplied to the boundary layer by the surface discharges. It is created by the voltage supplied to the electrodes by the voltage generator. Our theory determines the function $Q(\theta_S)$ as the necessary Joule heating to move the separation point to $\theta_S$. The function $Q(\theta_S)$ is used in the control sequence shown in FIG. 11b at step 176 with an iterative Newton algorithm that uses the gradient $$\frac{dQ}{d\theta_s}$$

to converge to the correct voltage for the proper discharge to provide the correct Q for robustly stable vortex symmetry.

Figure 12B:
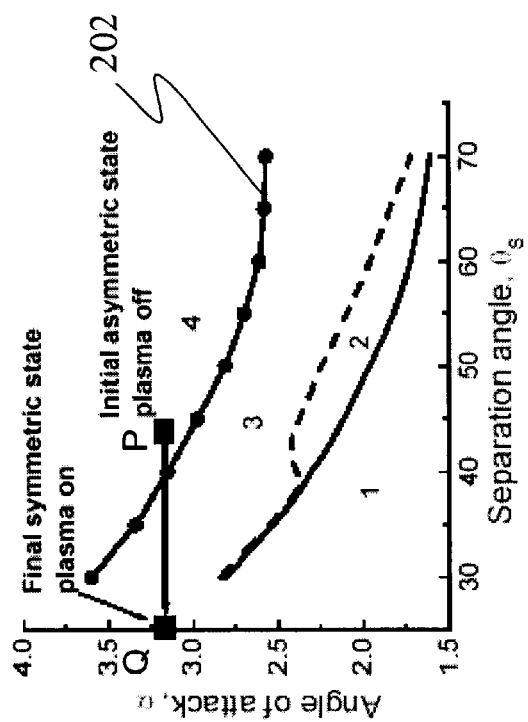
FIGS. 12a and 12b are respectively plots of separation angle as a function of heat-source intensity and plasma discharge effect on flow asymmetry that are critical elements of the control law indicated in FIGS. 11a and 11b.
Figure 12A:
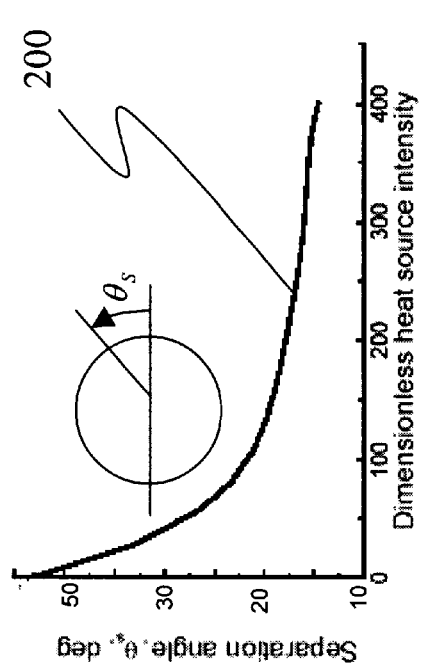

The function $Q(\theta_S)$ is depicted in FIG. 12a from the calculations of the theory. The aforementioned quick convergence and adaptation is vital to avoid yaw departure resulting in a crash. FIG. 12a shows a curve 200 of the separation angle $\theta_S$ as a function of heat source intensity. As the heat-source intensity parameter, $Q_0$, increases from 0 to 400, the separation angle, $\theta_S$, decreases from 43° to about 15°. It is also seen that the plasma heating is more effective in the range $Q_0 < 100$ where the slope $d\theta_S/dQ_0$ is relatively large. This trend verifies the premise that a plasma discharge can effectively control boundary-layer separation.

FIG. 12b is a curve 202 of the angle of attack versus separation angle $\theta_S$ showing the feasibility of vortex structure control using a plasma discharge modeled by local boundary layer heating. Due to the heat release, the flow configuration changes from the initial asymmetric state with $\theta_S \approx 43°$ (symbols in Region 4) to the symmetric state with $\theta_S < 39°$. This requires the non-dimensional heat source intensity $Q_0 \approx 10$. The corresponding total power is approximately 160 W. In region 1–3 stable symmetric vortex pairs occur. In region 4, asymmetric vortices are the primary equilibrium state. The calculated value shown as the solid lines is validated against experiment shown as the discrete points, and critical enabler for the present invention. The calculation for an example case shows that with the discharge off, the vortex pair is asymmetrical. Adding discharge heat moves the state from the large filled rectangle to another one to the left to the symmetric state. Summarizing, FIG. 12b shows how the theoretically derived Q can provide the required change in $\theta_S$ to bring it into the range for stable vortex symmetry. The stability boundaries are based on the aforementioned stability analyses. Referring to FIG. 12b, the proper amount of heat estimated from the relation $Q(\theta_S)$ is used to move $\theta_S$ from the point P in the region 4 where asymmetry is the prevalent state which is its value without plasma heating to the Region 3 which is a stable region for vortex symmetry. The controller systems depicted in FIGS. 8, 9, and 11 use the control law that can provide this result. This example indicates that the plasma yaw and stall-spin departure control method is feasible for practical applications.

While several illustrative embodiments of the invention have been shown and described, numerous variations and alternate embodiments will occur to those skilled in the art. For example, aircraft is intended to include all types of flight vehicles including high performance fighters, commercial aircraft, unmanned aircraft, missiles and others. Such variations and alternate embodiments are contemplated, and can be made without departing from the spirit and scope of the invention as defined in the appended claims.

We claim:

1. An aircraft, comprising:
   a forebody, and
   plasma discharge elements located to starboard and port on the forebody, said plasma discharge elements being adapted to generate a plasma to control a yawing moment on said forebody.

2. The aircraft of claim 1, wherein during flight a boundary layer separates at two points $S_+$ and $S_-$ as the air flow moves past the forebody and feeds itself into a pair of vortices, said plasma discharge elements being adapted to generate the plasma to control an angular location of separation points $S_+$ and $S_-$ to control the yawing moment on the forebody.

3. The aircraft of claim 2, wherein when maneuvering at sufficiently steep angles of attack said boundary layer may feed itself into a pair of asymmetric vortices causing yaw departure, said plasma discharge elements being adapted to generate the plasma to move the angular location of separation points $S_+$ and $S_-$ away from a line of symmetry in the forebody and towards an equatorial line to reduce the asymmetry of the vortices and mitigate against yaw departure.

4. The aircraft of claim 3, wherein the plasma discharge elements are adapted to generate the plasma to move the angular location of separation points $S_+$ and $S_-$ away from the line of symmetry in the forebody and towards the equatorial line to angular locations that provide a robustly stable symmetric vortex pattern that avoids yaw departure.

5. The aircraft of claim 2, further comprising a vertical tail with a rudder that is adapted to provide lateral control of the aircraft when maneuvering, said plasma discharge elements being adapted to generate the plasma to move the angular location of separation points $S_+$ and $S_-$ to control the asymmetry of the vortices to produce an additional yawing moment to supplement the lateral control provided by the vertical tail.

6. The aircraft of claim 5, wherein the plasma discharge elements are adapted to generate the plasma to move the angular location of separation points $S_+$ and $S_-$ toward the line of symmetry in the forebody and away from the equatorial line to angular locations that provide an asymmetric vortex pattern that produces a yawing moment.

7. The aircraft of claim 2, wherein the plasma discharge elements are adapted to generate the plasma to create a thermal gradient between the port and starboard sides of the forebody to control the angular locations of the separation points.

8. The aircraft of claim 2, wherein the plasma discharge elements are adapted to generate the plasma to produce a volumetric heating of the boundary layer on and above the surface of the forebody.

9. The aircraft of claim 2, wherein the plasma discharge elements are adapted to generate the plasma to heat the boundary layer on a time scale at least commensurate with changes in flight conditions to stabilize the angular locations of the separation points.

10. The aircraft of claim 2, further comprising additional plasma discharge elements adapted to generate a plasma that turbulizes the airflow about the forebody to further stabilize the vortices.

11. The aircraft of claim 10, wherein the additional plasma discharge elements are spark discharge elements.

12. The aircraft of claim 2, wherein the plasma discharge elements are selected from at least one of glow, corona, sliding, slipping or spark discharge elements.

13. The aircraft of claim 2, further comprising;
pressure sensors located to starboard and port on the forebody that sense a pressure distribution around the forebody; and
a closed-loop controller that controls the plasma discharge elements in response to the sensed pressure distribution to control the yawing moment.

14. The aircraft of claim 13, wherein the closed-loop controller estimates the required plasma by initially sensing the asymmetry from the pressure distribution and then manipulating the asymmetry by heating according to the solution of the compressible boundary layer equations with the plasma discharge elements to move the separation points.

15. The aircraft of claim 13, further comprising;
sensors on the forebody that sense whether the flow is laminar or turbulent, and
additional plasma discharge elements adapted to generate a plasma that turbulizes the airflow about the forebody on both port and starboard sides, said closed-loop controlling selectively controlling the additional plasma discharge elements as needed to further stabilize the yawing moment.

16. An aircraft, comprising:
a forebody wherein during flight a boundary layer separates at two points $S_+$ and $S_-$ as the air flow moves past the forebody and feeds itself into a pair of vortices, and
plasma discharge elements located to starboard and port on the forebody, said plasma discharge elements being adapted to generate a plasma that volumetrically heats the boundary layer on and above the surface of the forebody on a time scale at least commensurate with changes in flight conditions to create a thermal gradient between the port and starboard sides of the forebody to control an angular location of separation points $S_+$ and $S_-$ and control a yawing moment on the forebody.

17. The aircraft of claim 16, wherein when maneuvering at sufficiently steep angles of attack said boundary layer may feed itself into a pair of asymmetric vortices causing yaw departure, said plasma discharge elements being adapted to generate the plasma to move the angular location of separation points $S_+$ and $S_-$ away from a line of symmetry in the forebody and towards an equatorial line to reduce the asymmetry of the vortices and mitigate against yaw departure.

18. The aircraft of claim 16, further comprising a vertical tail with a rudder that is adapted to provide lateral control of the aircraft when maneuvering, said plasma discharge elements being adapted to generate the plasma to move the angular location of separation points $S_+$ and $S_-$ to control the asymmetry of the vortices to produce an additional yawing moment to supplement the lateral control provided by the vertical tail.

19. The aircraft of claim 16, further comprising additional plasma discharge elements adapted to generate a plasma that turbulizes the airflow about the forebody to further stabilize the vortices.

20. The aircraft of claim 16, further comprising;
pressure sensors located to starboard and port on the forebody that sense a pressure distribution around the forebody; and
a closed-loop controller that controls the plasma discharge elements in response to the sensed pressure distribution to control the yawing moment.

21. An aircraft, comprising:
a forebody wherein during flight a boundary layer separates at two points $S_+$ and $S_-$ as the air flow moves past the forebody and feeds itself into a pair of vortices,
pressure sensors located to starboard and port on the forebody that sense a pressure distribution around the forebody,
plasma discharge elements located to starboard and port on the forebody, and
a closed-loop controller that controls the plasma discharge elements in response to the sensed symmetries or asymmetries in said pressure distribution to manipulate an angular location of separation points $S_+$ and $S_-$ and produce a yawing moment on the forebody.

22. The aircraft of claim 21, further comprising;
heat transfer gauges located to starboard and port on the forebody to sense the flow, and
additional plasma discharge elements adapted to generate a plasma that turbulizes the flow about the forebody to further stabilize the vortices.

23. The aircraft of claim 22, wherein when maneuvering at sufficiently steep angles of attack said boundary layer may feed itself into a pair of asymmetric vortices causing yaw departure, said plasma discharge elements being adapted to generate the plasma to move the angular location of separation points $S_+$ and $S_-$ away from a line of symmetry in the forebody and towards an equatorial line to reduce the asymmetry of the vortices and mitigate against yaw departure.

24. The aircraft of claim 22, further comprising a vertical tail with a rudder that is adapted to provide lateral control of the aircraft when maneuvering, said plasma discharge elements being adapted to generate the plasma to move the angular location of separation points $S_+$ and $S_-$ to control the asymmetry of the vortices to produce an additional yawing moment to supplement the lateral control provided by the vertical tail.

25. An aircraft, comprising:
a forebody wherein during flight a boundary layer separates at two points $S_+$ and $S_-$ as the air flow moves past the forebody and feeds itself into a pair of vortices,
a vertical tail with a rudder that is adapted to provide lateral control of the aircraft when maneuvering
pressure sensors located to starboard and port on the forebody that sense a pressure distribution around the forebody, plasma discharge elements located to starboard and port on the forebody, said plasma discharge elements being adapted to generate a plasma that volumetrically heats the boundary layer on and above the surface of the forebody on a time scale at least commensurate with changes in flight conditions to create a thermal gradient between the port and starboard sides of the forebody, and a closed-loop controller that controls the plasma discharge elements in response to the sensed pressure distribution to move the angular location of separation points $S_+$ and $S_-$ to produce an additional yawing moment to supplement the lateral control provided by the vertical tail.

26. An aircraft, comprising:

a forebody wherein when maneuvering at sufficiently steep angles of attack a boundary layer separates at two points $S_+$ and $S_-$ as the air flow moves past the forebody and feeds itself into a pair of asymmetric vortices causing yaw departure, pressure sensors located to starboard and port on the forebody that sense a pressure distribution around the forebody, plasma discharge elements located to starboard and port on the forebody, said plasma discharge elements being adapted to generate a plasma that volumetrically heats the boundary layer on and above the surface of the forebody on a time scale at least commensurate with changes in flight conditions to create a thermal gradient between the port and starboard sides of the forebody, and a closed-loop controller that controls the plasma discharge elements in response to the sensed pressure distribution to move the angular location of separation points $S_+$ and $S_-$ away from a line of symmetry in the forebody and towards an equatorial line to reduce the asymmetry of the vortices and mitigate against yaw departure.

27. The aircraft of claim 26, further comprising;

heat transfer gauges located to starboard and port on the forebody to sense the flow, and additional plasma discharge elements adapted to generate a plasma that turbulizes the flow about the forebody to further stabilize the vortices.

28. A method of producing a yawing moment on the forebody of an aircraft, in which during flight a boundary layer separates at two points $S_+$ and $S_-$ as the air flow moves past the forebody and feeds itself into a pair of vortices, comprising:

sensing a pressure distribution around the forebody, and discharging a plasma around the forebody to control the angular location of separation points $S_+$ and $S_-$ to control the yawing moment on the forebody.

29. The method of claim 28, wherein during flight a boundary layer separates at two points $S_+$ and $S_-$ as the air flow moves past the forebody and feeds itself into a pair of vortices, said plasma being discharged to control an angular location of separation points $S_+$ and $S_-$ to control the yawing moment on the forebody.

30. The method of claim 29, wherein when maneuvering at sufficiently steep angles of attack said boundary layer may feed itself into a pair of asymmetric vortices causing yaw departure, said plasma being discharged to move the angular location of separation points $S_+$ and $S_-$ away from a line of symmetry in the forebody and towards an equatorial line to reduce the asymmetry of the vortices and mitigate against yaw departure.

31. The method of claim 29, wherein the aircraft comprises a vertical tail with a rudder that is adapted to provide lateral control of the aircraft when maneuvering, said plasma being discharged to move the angular location of separation points $S_+$ and $S_-$ to control the asymmetry of the vortices to produce an additional yawing moment to supplement the lateral control provided by the vertical tail.

32. The method of claim 29, wherein the plasma is discharged to volumetrically heats the boundary layer on and above the surface of the forebody on a time scale at least commensurate with changes in flight conditions to create a thermal gradient between the port and starboard sides of the forebody to control an angular location of separation points $S_+$ and $S_-$ and control a yawing moment on the forebody.

33. The method of claim 29, further comprising discharging additional plasma that turbulizes the airflow about the forebody to further stabilize the vortices.

* * * * *